United States Patent

Angold

[15] 3,649,290
[45] Mar. 14, 1972

[54] COOKING FOOD UNDER PRESSURE

[72] Inventor: Raymond H. Angold, 179 Fairway Hill Crescent, Kingston, Ontario, Canada

[22] Filed: July 28, 1970

[21] Appl. No.: 58,951

Related U.S. Application Data

[63] Continuation-in-part of Ser. No. 750,671, June 20, 1968, abandoned.

[52] U.S. Cl..........................................99/1, 99/107, 99/111
[51] Int. Cl....................A22c 21/00, A22c 25/00, A23l 1/00
[58] Field of Search..................99/1, 100, 107, 111, 330, 408

[56] References Cited

UNITED STATES PATENTS

| | | | |
|---|---|---|---|
| 2,532,639 | 12/1950 | Payne | 99/101 X |
| 3,159,095 | 12/1964 | Wagner | 99/408 |
| 3,210,193 | 10/1965 | Martin | 99/107 X |
| 3,336,859 | 8/1967 | Barker et al. | 99/107 X |

*Primary Examiner*—Hyman Lord
*Attorney*—Stevens, Davis, Miller & Mosher

[57] ABSTRACT

A process for preparing and cooking food is described wherein the cooking is by pressure cooking in a liquid under pressure greater than atmospheric. The food to be cooked is placed into a pressurizable chamber that is substantially empty of any cooking liquid. Hot cooking oil or other cooking liquid is then pumped under pressure into the chamber to immerse and effect cooking of the food. After a predetermined time interval substantially all of the cooking liquid is drained from the cooking chamber, and the cooked food removed therefrom. Preferably, hot cooking liquid is circulated through the chamber continuously during cooking. A process for preparing food that is being precooked by pressure cooking in a cooking oil or fat under pressure is also described, especially for food such as chicken, fish or the like.

3 Claims, 8 Drawing Figures

COOKING FOOD UNDER PRESSURE

This application is a continuation-in-part of my copending U.S. application Ser. No. 750,671, filed June 20, 1968; and now abandoned; which is a division from my application Ser. No. 436,440, issued on Mar. 11, 1969, as U.S. Pat. No. 3,431,835.

The present invention relates generally to the preparation and cooking of food. More particularly, this invention is concerned with an improved process for pressure cooking foodstuff such as chicken, fish or the like in a pressurizable cooking chamber. The food to be cooked is placed into the cooking chamber when the latter is substantially empty of any cooking liquid, and following draining of the cooking liquid after a predetermined period of time during which cooking has taken place, the cooked food is removed from the chamber, again substantially empty of any cooking liquid. No food is put directly into or taken out of hot cooking liquid.

BACKGROUND OF THE INVENTION

In recent years, it has been found advantageous to cook some food such as those mentioned above, in a heated liquid (e.g., hot fat) under pressure, rather than in open fryers. This method of cooking, i.e., pressure cooking has found particularly successful application in the cooking of chicken. As a result, there has been a recent upsurge in the popularity of "-fried" chicken. The cooking of food in hot fat or oil in containers designed to keep the food under pressure while cooking proceeds, can utilize the natural juices and water contained in the food to produce the desired pressure. Initially, some moisture in the food being cooked is vapourized by the hot fat and the steam so generated pressurizes the closed container. In some instances, additional water can be injected into the cooking chamber.

The cooking of food in hot fat or oil under pressure has a number of advantages over the open-fryer method. The use of pressure greater than atmospheric, for example, in the cooking chamber, raises the boiling point of any moisture in the food. The food itself can thus be brought to a higher temperature than in the open-fryer method, and this reduces the cooking time required, resulting in the food being cooked sooner. Cooking the food under pressure also enables retention of moisture in the food, which would have otherwise been lost in open-fryer frying. Hence, there is a reduction in the absorption of fat by the food which not only reduces the amount of fat consumed in the cooking operation, but produces a cooked product that is more tender and palatable. In the case of foods which have been spiced or seasoned before being placed into the cooker, the increased pressure results in better impregnation and distribution of the spices or seasonings into the food.

From the foregoing, it is apparent that the cooking of foods in fat under pressure takes less time, and results in food which possesses superior eating qualities.

One process of cooking food in fat under pressure that is in common use today utilizes a number of large, open deep-fat fryers which serve as reservoirs, and a large number of smaller pressure cookers of a size not much larger than the pressure cookers often used in private homes. The hot fat is ladled from the deep-fat fryer into a pressure cooker which is then carried a few steps and set onto an open burner, usually a gas flame. There, the temperature of the hot fat is raised even higher in order to accommodate the considerable temperature drop that will occur when cold food is placed into the fat. The lid is often left off the pressure cooker until the food has started to brown. The pressure cooker is then sealed with the lid, and the cooking completed. When the desired cooking time has expired, the lid is removed and the food scooped up from the hot fat. The pressure cooker is then carried over to the second open fryer into which the hot fat is dumped. A filter is usually placed between the second fryer and the first fryer (from which the hot fat was originally taken) with any crumbs or particles being removed from the fat as it passes through the filter to the first fryer. This prepares the hot fat for subsequent reuse.

The process described immediately above possesses several disadvantages. The open fryers and many burners and cookers require a large kitchen area, and in addition, the heat produced by such burners usually necessitates a large and costly exhaust system. In some instances, it has been found necessary to house the cooking equipment in a separate room. That prior art method is also messy as well as being relatively dangerous. The pressure cookers of hot fat must be ladled full and then carried to a burner where the food is subsequently placed into the container of hot fat. Spilling and splashing of the hot fat could easily occur, tending to make the floors and equipment both dirty and slippery. As a result, there was a considerable hazard and risk that persons involved in the cooking operation might slip and fall, or be burned by contact with the hot fat. Still another disadvantage arises because there is only a small volume of fat that can be contained in each individual pressure cooker. Consequently, a very high initial temperature is required to accommodate the cooling which occurs when the "cold" food is first placed into the fat, such as when initial browning of the food is to be effected. This initially high temperature hastens deterioration of the quality of the cooking oil or fat. Finally, at busy times kitchen personnel were prone to forgetting to remove the pressure cookers at the correct time, resulting in burning and wastage of the food.

In one attempt to overcome some of these disadvantages, a pressure cooker that had heating elements built into it, and that also served as the reservoir for the hot cooking liquid, was formed as a single unit. Examples of such apparatus are disclosed in U.S. Pat. Nos. 2,778,736, and 2,914,063, of Wagner respectively issued on Jan. 22, 1957 and Nov. 24, 1959. Certain problems, however, still remained. In the Wagner type of cooker, successive portions of food are cooked in the same fat without any filtering of the latter. Since the food being cooked in the deep fat is in many cases floured or breaded, and spiced, the accumulation of contaminants picked up by the fat causes quite a rapid deterioration of the same. Moreover, the palatability of the food is impaired due to the "burned" impurities or contaminants in the hot fat. Further yet, there remains the danger of persons being burned when putting food into, or taking it out of the cooker containing the hot fat. The Wagner-type of apparatus contains an even more serious defect from a commercial point of view, namely, that the apparatus is limited in size. It simply is not feasible to use in a large-scale, automated process for cooking food under pressure. This type of apparatus has consequently met with only limited acceptance.

SUMMARY OF THE INVENTION

The present invention as embodied in the process below, and the apparatus described herein for practising that process, overcomes many of the disadvantages of the prior art. To this effect, the present process calls for inserting and removing food from a cooking chamber when it is substantially empty of any cooking liquid. In other words, whereas prior art processes were based on the concept of bringing the food to the cooking medium (usually cooking liquid), the process herein is based upon the discovery that by bringing the cooking liquid to the food, a significantly improved technique for cooking food can be achieved. One important result of that improved technique is a greatly reduced risk or hazard to operating personnel, for instance, which arises because no food is put into or taken out of hot cooking liquid. Many other important advantages are also to be derived from the discovery on which this invention is based. These will be evident from the detailed description below.

In a broad sense, therefore, I provide in accordance with one aspect of this invention a process for cooking food in a pressurizable chamber, the steps of placing the food into the chamber which is substantially empty of any cooking liquid: closing and sealing the chamber: introducing hot cooking liquid under pressure greater than atmospheric into the chamber to immerse and effect cooking of the food therein; draining substantially all of the cooking liquid from the chamber after a predetermined interval of time; unsealing and opening the chamber; and removing the cooked food from the chamber. The cooking liquid is usually circulated through the cooking chamber, and preferably will have been filtered to remove any contaminants therefrom, and reheated before being introduced into the cooking chamber.

It is an object of this invention, therefore, to provide an improved process for cooking food which retains the advantages of cooking food in a liquid under pressure, while minimizing many of the disadvantages and objections to processes known in the prior art.

It is also an object of this invention to provide an improved process wherein no food is placed directly into, or removed from the hot cooking liquid by operating personnel, thereby reducing many of the deficiencies of the prior art.

It is an object of a preferred embodiment of this invention to provide hot cooking liquid which is circulated through the cooking chamber while cooking is taking place.

Also, it is an object of another preferred embodiment of this invention to provide a process for preparing food that is being precooked by pressure cooking in a hot cooking liquid under pressure greater than atmospheric.

These and other objects and features of the present invention will become apparent from the detailed description below, when read with reference to the accompanying drawings that illustrate some forms of apparatus that can be used to practice the improved process for cooking food described herein.

DESCRIPTION OF THE PREFERRED EMBODIMENTS

Figure 1:
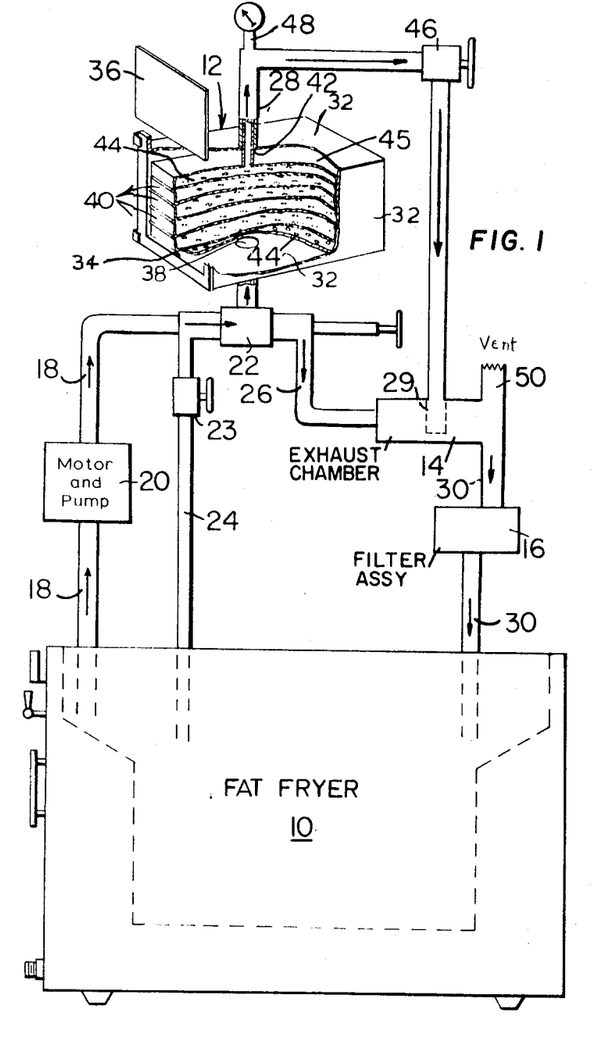
FIG. 1 is a schematic view showing the interrelationship of the various components of one form of cooking apparatus used for carrying out the improved process for cooking food, to be described below.

Referring now to the drawings, the schematic view of FIG. 1 is representative, for example, of an arrangement that can successfully be used to practise the present invention on a scale compatible with that required by a restaurant or hotel kitchen, takeout stores, or the like. In FIG. 1, a conventional deep-fat fryer is shown at 10, being operable to serve as a supply of cooking liquid, in this case, hot cooking fat or oil. This fat fryer 10 will frequently be a standard, commercially available fryer with the capacity desired, and equipped with the necessary heating elements (or gas combustion chambers) and controls needed to heat and maintain the fat or oil at any desired temperature. Alternatively, the fat fryer 10 could be a custom built tank made, for example, from stainless steel, and provided with electrical heating elements or gas combustion chambers built therein for heating and maintaining the cooking liquid at a desired temperature. In any event, the fat fryer 10 functions to supply hot cooking fat or oil to a pressurizable cooking chamber 12, and from that chamber the cooking liquid subsequently passes through an exhaust chamber 14, a filter assembly 16, and back to the fat fryer 10.

Conventional piping such as stainless steel tubing 18 interconnects the fat fryer 10 and the cooking chamber 12. A pump 20 that is preferably of a gear-type, and a multiway valve 22 (see FIGS. 3-6) are provided in the pipeline 18. I have found in practise that a small electric motor is very suitable for driving the pump 20, since it can readily be controlled. Other equivalent sources of power could also be used to drive the pump 20. The suction side of the pump 20 draws hot cooking liquid from the fat fryer 10, and pumps the same into the cooking chamber 12, under pressure. It will be apparent that depending upon the specific nature of the multiway valve 22 being used, that valve can be set or activated to direct cooking liquid to the chamber 12 in any one of several different ways. If the valve 22 is pressure-responsive, then pressure from the delivery side of the pump 20 will set the valve to direct the cooking liquid into the chamber 12. This will be further explained below. Alternatively, a solenoid-operated valve could be used at 20, and that valve could be set, say, by switching on of the pump motor, or by a master timer. The multiway 22 illustrated in FIGS. 3-6 is a mechanically-operated, pressure-responsive valve. It will be recognized, moreover, that instead of a single multiway valve, a plurality of one-way valves could also be used to direct the flow of cooking liquid in the manner desired.

The multiway valve 22 is also operatively associated with conduits 24 and 26, that again may be of conventional piping such as stainless steel tubing. Conduit 24 is simply a bypass line which is provided with a one-way valve 23. The valve 23 is basically a controlled opening completely separate from the multiway valve 22. In addition, valve 23 operates to relieve pressure on the multiway valve 22, at the end of the cooking cycle and to relieve pressure on the pump 20 when the valve 22 is set for controlled volume flow through the cooking chamber 12 which occurs while cooking takes place. There is a bypass control valve built into the pump 20 and this is adjusted to give the pressure desired in the multiway valve 22. The conduit 26 interconnects the multiway valve 22 with the exhaust chamber 14 for reasons to be explained more fully below. A conduit 28 is provided to connect the cooking chamber 12 to the exhaust chamber 14. An additional conduit 30 connects the latter with the fat fryer 10. It is to be noted that although the filter assembly 16 is shown in the conduit 30, that filter assembly could alternatively be associated directly with the discharge outlet from the exhaust chamber 14, or mounted on the fat fryer 10. In all cases, this filter assembly 16 functions to remove any contaminants such as bread crumbs, spices, flour, pieces of raw or semicooked food, or the like from the cooking liquid before the latter is returned to the fat fryer 10 for reheating and reuse. The construction detail and operation of the filter assembly 16 is preferably identical to that described in my copending U.S. application Ser. No. 716,437, filed Mar. 27, 1968 and now abandoned.

Note that FIG. 1 is schematic and is not intended to show the relative positions, sizes, or configurations of the various components of the apparatus. FIG. 1 is intended only to show the interrelation between such components.

It will be recognized that the cooking chamber 12 can be of a physical size that is compatible with the production capacity which it is expected to accommodate. Moreover, the cooking chamber 12 usually comprises a generally rectangular enclosure having top, bottom, and sidewalls 32. One of the sides, however, is open as at 34 to provide access to the cooking chamber 12. A door or closure element 36 is slidably or otherwise supported on the cooking chamber 12 to enable closing open side 34. This door 36 together with suitable flanges provided on the open side 34 of the cooking chamber are provided with resilient gasket means which will enable the door to be closed in such a way as to seal the cooking chamber 12. The mechanism which is used to seal the door 36 enabling the cooking chamber 12 to be pressurized can be any one of a number of different designs that will be apparent to persons knowledgeable in this art.

Hot liquid under pressure greater than atmospheric is introduced into the chamber 12 through an inlet orifice 38 that is in communication with conduit 18. This orifice 38 is normally located generally centrally in the bottom of the cooking chamber 12. The food to be cooked is usually placed upon stackable supporting trays shown at 40. The design of these trays 40 can be a matter of choice, however, they will preferably be of a type that can be stacked one upon the other. Very efficient use of the space within the cooking chamber 12 can thus be gained. Since the conduit 28 is connected to a discharge orifice 42 that is also normally located centrally of the top of the cooking chamber 12, it is convenient to provide an upper and lower baffle 44 (and outlet hood 45), which baffles can be perforated as suggested in FIG. 1 to ensure that there is an adequate circulation of fresh hot cooking liquid uniformly distributed over most of the pieces of food being carried on trays 40. It will be apparent that if baffles 44 were not provided, there would be a tendency for the cooking liquid to pass more or less directly from the inlet orifice 38 to the discharge orifice 42, with the result that food in the central part of the chamber 12 would tend to become cooked more quickly and more thoroughly than food on the trays 40 nearer the walls of the cooking chamber. In the particular version of the apparatus shown in FIG. 1, the cooking chamber 12 may be insulated against heat loss, however, no auxiliary heating of the cooking liquid therein is provided.

A pressure control valve as shown schematically at 46 is provided in the conduit 28, and in addition, pressure sensing and indicating means such as gauge 48 can also be provided in the conduit 28. Alternatively, the pressure sensing and indicating means could be provided in the top of the cooking chamber 12. A pressure release valve will usually be provided, also in the top of the cooking chamber 12, for reasons of safety.

It is to be noted that the conduit 28 extends only slightly into the interior of the exhaust chamber 14, and preferably has a strainer 29 operatively associated with the end of the conduit within the exhaust chamber. Since the exhaust chamber 14 is vented to atmosphere at 50, atmospheric pressure conditions are to be found within that chamber. In that way, any steam or other gases generated from the natural juices in the food being cooked, absorbed, and retained in the pressurized liquid, can now bubble out of the same and be vented to atmosphere by vent line 50, because of the lower pressure within chamber 14. From the exhaust chamber 14, conduit 30 conveys the cooking liquid back to the fat fryer, with filtering of that liquid usually taking place somewhere between the exhaust chamber and fat fryer.

The apparatus of FIG. 1 is operated as follows. Pieces of the food to be cooked are prepared for pressure cooking, generally by initially dipping the same in a solution or "wash." Subsequently the food is coated with seasoned flour, bread crumbs, or the like, and then placed upon the stackable trays 40. These operations are usually carried out, say, at one end or one side of a room in which the cooking apparatus is housed. The trays 40 of food to be cooked are then placed into the cooking chamber 12, and depending upon how many trays are stacked one upon the other, the upper baffle 44 and outlet hood 45 could be lowered and adjusted to be fairly close to the upper tray of food. In accordance with the improved technique of cooking food as described herein, the trays 40 of raw food are placed into the cooking chamber 12 when the latter is substantially empty, i.e., more or less dry, of any cooking liquid. Once the food has been put into the cooking chamber 12, and the upper baffle 44 and outlet hood 45 adjusted if necessary, the door 36 is then closed and sealed tight.

A conventional control circuit (not shown) operatively connects the motor driven pump 20, and an electrical timer, which can be preset, and the circuit is activated to condition such elements ready for the cooking operation. It will be apparent that the fat fryer 10 will usually have been put into operation earlier so that, in fact, a supply of hot cooking fat at a temperature in the range from about 325° to about 375° F. is available at this time. That temperature range applies for the cooking of chicken. For other foods, some other temperature range will apply. In any event, the temperature at which the fat fryer 10 is to supply cooking liquid can be preselected by the kitchen personnel operating the same.

Once the above-mentioned electrical control circuit has been activated, such as by pushing an "on" button, the electric motor which drives pump 20 comes on to pump hot cooking liquid from the fat fryer 10 into the bottom of the cooking chamber 12. It will be apparent that the multiway valve 22 will have been activated so as to enable the hot cooking liquid to pass therethrough and into the cooking chamber 12, rather than on through conduit 26 to the exhaust chamber 14. In the present case, the valve 22 is pressure responsive, being activated or set by the presence or absence of pump delivery pressure, and any back pressure downstream in the system. By referring to FIG. 3 in particular, the reader will see that as soon as pump 20 begins to supply cooking liquid under pressure, that pressure overcomes the biasing forces of the valve springs to set or open the valve 22 "fully open." The chamber 12 thus fills at an initially high-volume flow rate of liquid. The cooking chamber 12 is normally manufactured from steel, preferably stainless steel, or like material, and the food to be cooked therein is initially at room temperature. Consequently, the hot cooking liquid which is initially supplied at about 375° F. (subject to any heat loss in transit from fat fryer 10) will cool down until thermal equalibrium has been established in the cooking chamber 12. For chicken, the temperature in the cooking chamber will usually level off and be maintained during cooking in the range from about 250° to about 300° F. Again, for other foods this temperature range may vary.

As the cooking chamber 12 fills up with cooking liquid heat is transferred to the food to be cooked, causing some water or natural juices in the same to be vapourized. The evaporated liquid forms a cushion of steam or other vapour in the top of the cooking chamber 12. The pressure control valve 46 had been preset to control and regulate the pressure within the cooking chamber 12 at a pressure in excess of normal atmospheric pressure, usually by about 10 to 20 pounds per square inch depending upon the food being cooked. When the vapour cushion has built up a pressure equivalent to that at which the control valve 46 is intended to operate, that valve opens and maintains the pressure in the chamber 12 at the selected pressure. It is particularly to be noted that the pump 20 will supply hot cooking liquid at a pressure in excess of the 10 to 20 pounds per square inch above atmospheric pressure, which is intended to be maintained in the cooking chamber 12. In so doing, maintenance of the operating pressure within the cooking chamber 12 will be independent of the content of water and other natural juices in the food being cooked. Theoretically at least, it would be possible to operate the cooking chamber 12 with no cushion of vapor in the same. In practise, however, the food being cooked will usually contain a certain amount of natural juices. Also, water or wash solution has been involved in preparing and precoating the food prior to placing the same into the cooking chamber 12. Some of that moisture is vapourized upon initial exposure to the hot cooking liquid, and a vapor cushion is invariably formed in chamber 12.

As the cooking chamber 12 fills with hot cooking liquid and the desired operating pressure governed by valve 46 is being approached, a certain amount of back pressure will be seen both by the pump 20 and by the multiway valve 22. That back pressure now present in cooking chamber 12 will assist in enabling the main spring in valve 22 to move the piston therein to the position shown in FIG. 4. In the position of FIG.

Figures 4, 6:
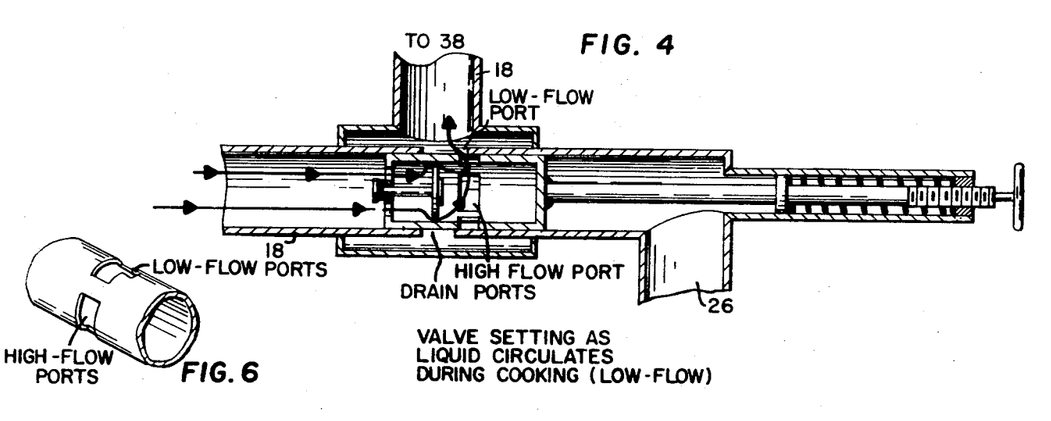
FIG. 6 is an elevation view taken in perspective of the flow regulating cylindrical sleeve in the valve of FIGS. 3-5, and showing the high- and low-flow ports therein.

4, the only access from conduit 18 downstream of the valve 22 to a point upstream of the same is through the "low-flow" ports provided specifically for this purposes. These "low-flow" ports can be as suggested in FIG. 6, or they can be a series of apertures that are separate from, but spaced slightly to the right of the "high-flow" ports shown in FIG. 6. Hence, even after the pressure at which cooking is to take place has been reached, the pump 20 will continue to supply hot cooking liquid to the chamber 12, but at a controlled volume flow rate. The volume flow rate of cooking liquid being pumped through the chamber 12 while cooking takes place is lower than that used initially to fill the cooking chamber. This lower flow, controlled volume flow rate provides cooking liquid which is dispersed by the lower baffle 44 to maintain the cooking temperature uniformly throughout the chamber, and in particular, over the various pieces of food being cooked. The flow of hot cooking liquid from the chamber 12 then goes to the exhaust chamber 14 where any moisture that had been absorbed into the hot cooking liquid under the operating pressure at which cooking took place, is released and can be vented to atmosphere via vent 50. Subsequently, after the cooking liquid passes through the filter where particulate contaminants are removed therefrom, reheating of the liquid in fat fryer 10 will involve liquid that is relatively pure. It is well known to those knowledgeable in this art that reheating of the cooking oil or fat which contains any significant quantities of the contaminating material mentioned above will rapidly cause a deterioration both in the quality of the cooking liquid as well as the palatability of the food being cooked.

The time within which cooking takes place is usually about 10 to 12 minutes for chicken, at the temperature and pressure conditions indicated above. For fish, or other types of food, some other pressure and temperature conditions might be used. As well, some other time period which can easily be determined, may be more appropriate for such other foods.

Figure 5:
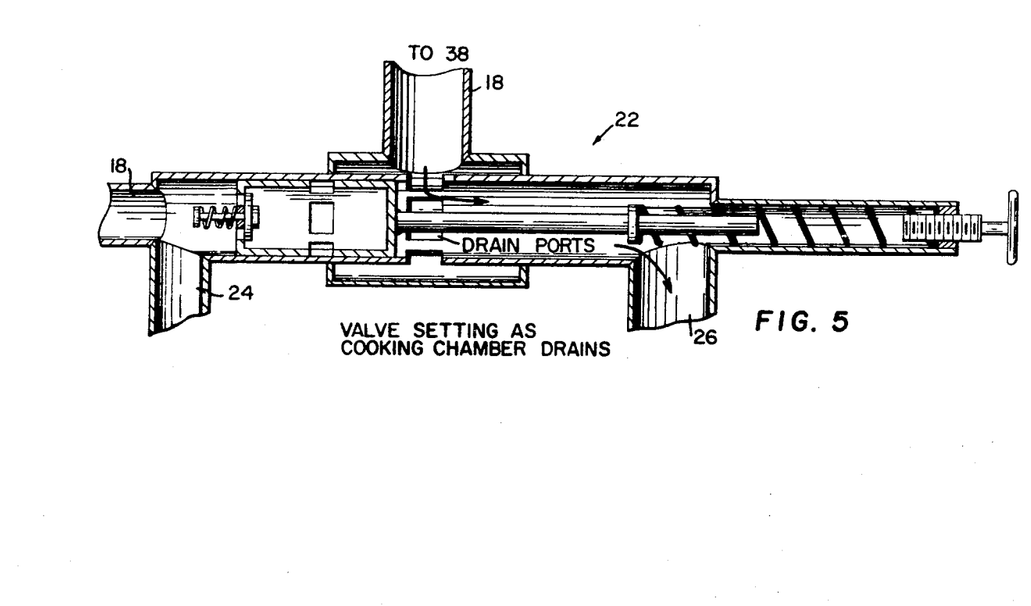

After the timer associated with the electrical control circuit senses that sufficient time has elapsed to ensure that the food in chamber 12 has been cooked adequately, the electrically driven pump 20 is stopped, and multiway valve 22 is activated to effect draining of the cooking liquid from chamber 12 via conduit 26 into the exhaust chamber 14, and subsequently back to the fat fryer 10. FIG. 5 shows the valve 22 set to allow draining of liquid from the chamber 12. Either after a further period of time, or in response to a signal from a liquid-sensing means in the bottom of cooking chamber 12, a signal light or little bell might indicate that the cooking chamber is now empty of any hot cooking liquid. As a result, kitchen personnel can then unseal and open door 36 to remove the trays 40 of cooked food. It is again to be noted that in accordance with the present technique, removal of the cooked food from the cooking chamber 12 takes place with that chamber being substantially empty, i.e., dry of anything but a small residue of cooking liquid. As a result, there is virtually no risk of splashing hot cooking liquid onto oneself and suffering burns therefrom. As a further advantage of that technique, if there is no immediate demand for the food that has been cooked, that food can be left on the trays within the cooking chamber 12 and maintained warm because of the residual heat in the cooking chamber.

It should be noted that operation of the multiway valve 22 or equivalents therefor can be made to be responsive to both pressure and an electrically sensed elapse of time. Such valves will allow draining of the cooking chamber 12 after cooking has taken place; or in the event of a stoppage in the operation of pump 20 with its subsequent loss of delivery pressure. In that way, the food would not continue to be cooked because of its immersion in hot cooking liquid. Hence the subsequent risk of overcooking, burning and probable wastage that could otherwise occur, will be eliminated.

It will be apparent from the foregoing that the use of a cooking chamber such as that shown at 12 which is separate from the hot fat fryer 10 used to supply the hot cooking liquid, has several advantages over the prior art processes currently in use. In the improved process for cooking food described herein, the food is always cooked in a supply of clean cooking liquid which is constantly filtered before being reheated. The automatic timer associated with the electrical control circuit which operates the pump motor accurately controls the cooking period and prevents overcooking. It is therefore unnecessary for the cooking staff to immediately remove the food, or to constantly watch the time to see that overcooking does not occur. The food is cooked by pressure cooking, at a moderate and steady temperature. To that end, thermometers may be included in the cooking chamber 12 to give the operator an easy and rapid check of that temperature. Alternatively, thermocouples or other electrically operated temperature-sensing means could be provided in the walls of the cooking chamber 12 with the temperature so read out being indicated upon a gauge. The present apparatus does not rely upon the natural moisture contained in the food product being cooked, to produce the cooking pressure. Instead, the pump 20 which supplies hot cooking liquid at a pressure in excess of the pressure at which cooking is intended to take place, will maintain that pressure in the cooking chamber, closely controlled by adjustment of the pressure control valve 46. By controlling the volume of fat or cooking oil which passes through the multiway valve 22 and chamber 12, as mentioned earlier in connection with FIG. 4, the color of the cooked food can be varied. Moreover, controlling the volume flow rate of cooking liquid passing through the chamber 12 is also an adjustment that allows various quantities of food to be cooked in the chamber 12, while still ensuring consistent quality in the palatability and color of the food. Such a feature is important since, it will be recognized by persons in this art, varying the amount of hot oil over the food being cooked while immersed therein will effect the coloring, crispness of the outer "skin" and moisture content of the food. The present technique enables one or several trays of chicken, for instance, to be cooked having the same amount of hot oil over the chicken pieces, by adjusting top baffle 44 and outlet hood 45. Adjusting the low-flow ports to suit the flow wanted for one or several trays of food will allow uniform coloring and quality in the cooked food to be obtained.

The present process as carried out by the apparatus of FIG. 1 uses no auxiliary burners, pots or pans, and thus spilling and splashing of the hot cooking fat or oil is eliminated. Moreover, the heat being passed by such burners to the surrounding area in which the apparatus is housed can be considerably reduced. As stated earlier, no food is put directly into or taken out of hot cooking fat or oil. The present process utilizes apparatus which requires a very moderate amount of space as compared to some previous methods. Moreover, a very large reduction is possible in the amount of extraneous heat produced by the apparatus, and hence installation of apparatus such as that shown in FIG. 1 into stores and kitchens does not require any major alterations. Of even greater importance to restaurateurs, the cooking apparatus which is used to carry out the present process is very simple and requires a minimum of skill and instruction to operate. Finally, the cooking liquid being used as the cooking medium can be conserved longer as it is not heated to very high initial temperatures, and also because the cooking liquid is heated only after it has been filtered and vapors therein vented to atmosphere, thus removing any contaminating materials which promote deterioration of the same.

Figure 2:
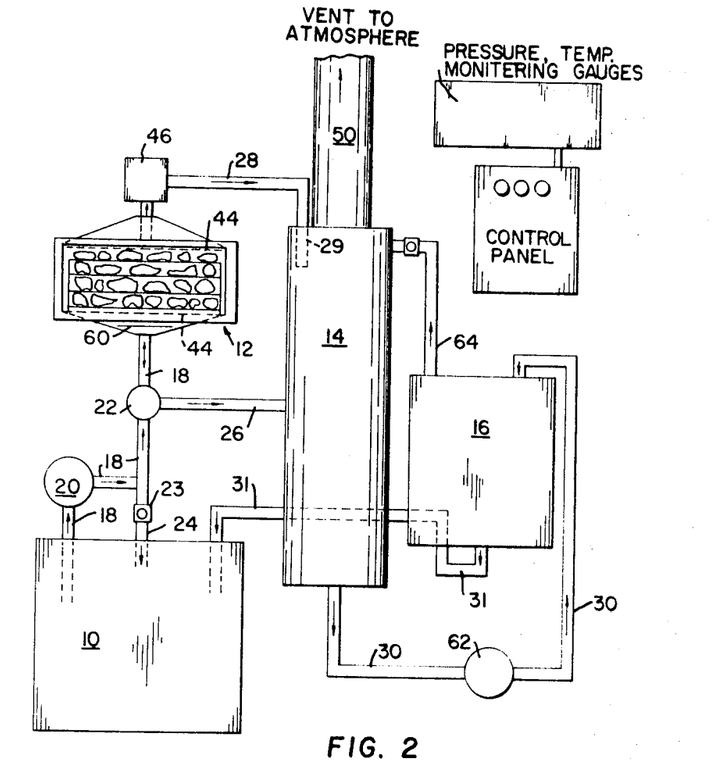
FIG. 2 is also a schematic view showing an arrangement similar to that in FIG. 1, but having certain modifications incorporated therein.
Figure 3:
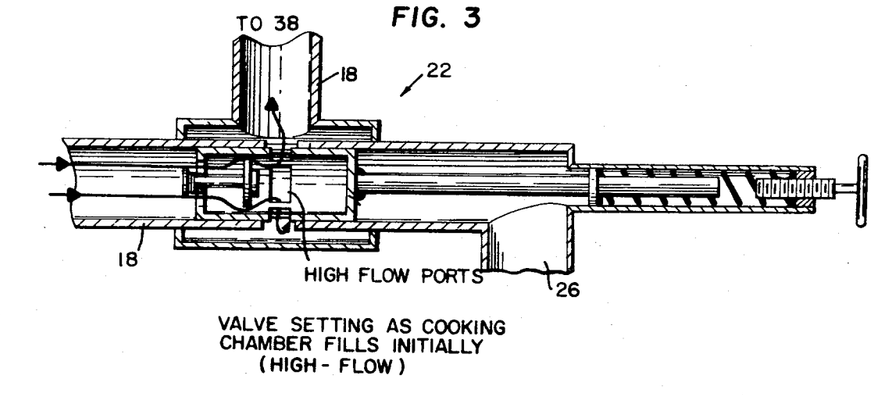
FIGS. 3, 4 and 5 are side elevation views taken in cross section longitudinally of the multiway valve shown in FIGS. 1 and 2, with FIG. 3 showing the valve set to allow high flow initial filling of the cooking chamber, FIG. 4 showing the valve set to allow low flow circulation during cooking, and FIG. 5 showing the valve set to allow draining of the cooking chamber.

Another form of apparatus that can be used to carry out the improved process herein can be seen in FIG. 2. There, an arrangement quite similar to that of FIG. 1 is shown. To the extent that many elements in FIGS. 1 and 2 are identical, the same reference numeral is used to identify like parts. In some respects, the apparatus of FIG. 1 could be considered as an experimental prototype, whereas the apparatus in FIG. 2 would more closely resemble apparatus of the type that would be used in a hotel kitchen, restaurant, or takeout store. In other words, the apparatus of FIGS. 1 and 2 is intended to allow the present process to be carried out on a relatively small scale. 1 have found for example that by using a cooking chamber that is of approximately 27 inches long by 17 inches wide by 12 inches high (outer dimensions), I am able to cook about 150 pieces of chicken at one time. This represents about sixteen whole chickens cut up for serving individual pieces thereof.

As seen in FIG. 2, the cooking chamber 12 is adapted to house a number of stackable trays, which can broadly be similar in structure to those shown in at 40 in FIG. 1. The top and bottom of chamber 12 have, however, been beveled so as to provide for a more positive circulation of the hot cooking liquid throughout the chamber. In addition, it will be apparent that a more thorough draining of the cooking chamber 12 (and of the pieces of food that have been cooked therein) is possible because of the tapering bottom which connects to the conduit 18. A solid baffle is shown at 60, and is provided as well as the upper and lower perforated baffles 44 of FIG. 1. In another modification, the apparatus of FIG. 2 employs a second pump 62, provided in the conduit 30 for pumping cooking liquid from the exhaust chamber 14 under some pressure to the filter assembly 16. The filter assembly 16 should be of a construction that is capable of filtering out uncooked food particles, flour, edible coating material and the like. It is well known, however, that such material all tend to cook onto to the filter medium when they are contained in the hot cooking liquid, say, hot fat or oil, which is preferably used herein. Considerable difficulty has been encountered in providing a filter structure which functions adequately in this regard, and I therefore prefer to use a filter assembly that is identical in structure and function to that described in my above mentioned U.S. application Ser. No. 716,437, filed Mar. 27, 1968. In yet a further modification, I have found from experience that providing a "check valve" in conduit 64, with the butterfly in that valve being provided with a small bore hole which allows steam and a small flow of cooking liquid to pass continuously therethrough to the exhaust chamber 14, further enables steam which may still be in the cooking liquid to be vented from the housing in which the filter assembly is contained. In this way, there is no tendency for an accumulation of steam within that housing, that would contribute to a reduction in the operating efficiency of the filter assembly. Also, the valve in conduit 64 acts as a vacuum breaker when the filter is drained. Although it is not necessary, I also prefer to provide a control panel having indicating gauges to monitor the operating temperatures and pressures at various points within the system. In that way, a more accurate control over the operation of the same can be obtained.

In order to practise the process of the present invention in a manner which minimizes the potential sources of human error, most of the operations have been automated. To this end, a control circuit of conventional design is conveniently used. In this control circuit there are provided relays and switches as well as pressure and temperature sensing elements that are connected to suitable gauges or other signal means for monitoring various conditions in different parts of the system. One or more timers are used so that once the pieces of food to be cooked have been loaded onto the trays and placed into the pressurizable cooking chamber 12, the door closed and sealed, and a main switch turned "on," the rest of the cooking operation will take place automatically.

To carry out the improved process for cooking food by pressure cooking the apparatus of FIG. 2 is operated as follows. The food to be cooked is placed on a series of racks that are preferably stackable, and then put into the cooking chamber 12. Usually, the food will have been pretreated with seasoned flour, bread crumbs or the like. The door to the cooking chamber is next closed and sealed tight, and the control circuit switched "on." In so doing, the pump 20 comes on to pump cooking liquid under pressure, through the multiway valve 22 and into the bottom of the cooking chamber 12. There, the baffles 60 and 44 function to cause the incoming flow of hot cooking liquid to be dispersed and circulated throughout the cooking chamber 12. As the chamber 12 fills up with hot oil, evapouration of moisture in the food to be cooked occurs, building up a vapor cushion at the top of the chamber. The pressure will continue to build up until such time as the pressure regulating or control valve 46 opens to maintain the pressure in the cooking chamber 12 at the level desired. Normally, this will be in the range from about 10 to 20 pounds above atmospheric pressure. Hot cooking liquid flows from chamber 12 by the conduit 28, into the exhaust chamber 14 from where it is pumped via the electrically driven gear-type pump 62 into the housing in which filter assembly 16 is contained. There, the driving pressure of the pump 62 will cause the cooking liquid to pass through the filter medium so that any particulate contaminating material therein will be removed. Because the check valve in conduit 64 has an aperture in the butterfly therein, the driving pressure of pump 62 will also cause some flow of liquid through that conduit and into the exhaust chamber 14. As noted previously, the exhaust chamber 14 is vented to atmosphere via line 50 and therefore an air space at atmospheric pressure conditions exists above any of the cooking liquid in that chamber. Accordingly, any moisture and vapor which had been absorbed into the hot cooking oil within the pressurized chamber 12 is now released from the cooking liquid to the airspace at atmospheric pressure conditions in chamber 14, and from there vented to atmosphere. It should be noted, that only a small flow of cooking liquid goes via the conduit 64 back into the exhaust chamber 14, whereas the major proportion of the flow being driven by pump 62 is through the filter medium in the filter assembly 16. Following passage through the filter assembly 16, the cooking liquid is conveyed by conduit 31 back to the fat fryer 10. Since the exhaust chamber 14 "removes" or allows for removing vapours and the filter assembly 16 removes physical contaminants from the cooking liquid, when the latter is returned to the fat fryer 10 for reheating, it is relatively clean and pure. A significantly longer working life of the liquid is thus possible before requiring replacement. The very rapid deterioration in the quality of the hot cooking oil or fat caused by impurities in the same is thus minimized.

Figure 7:
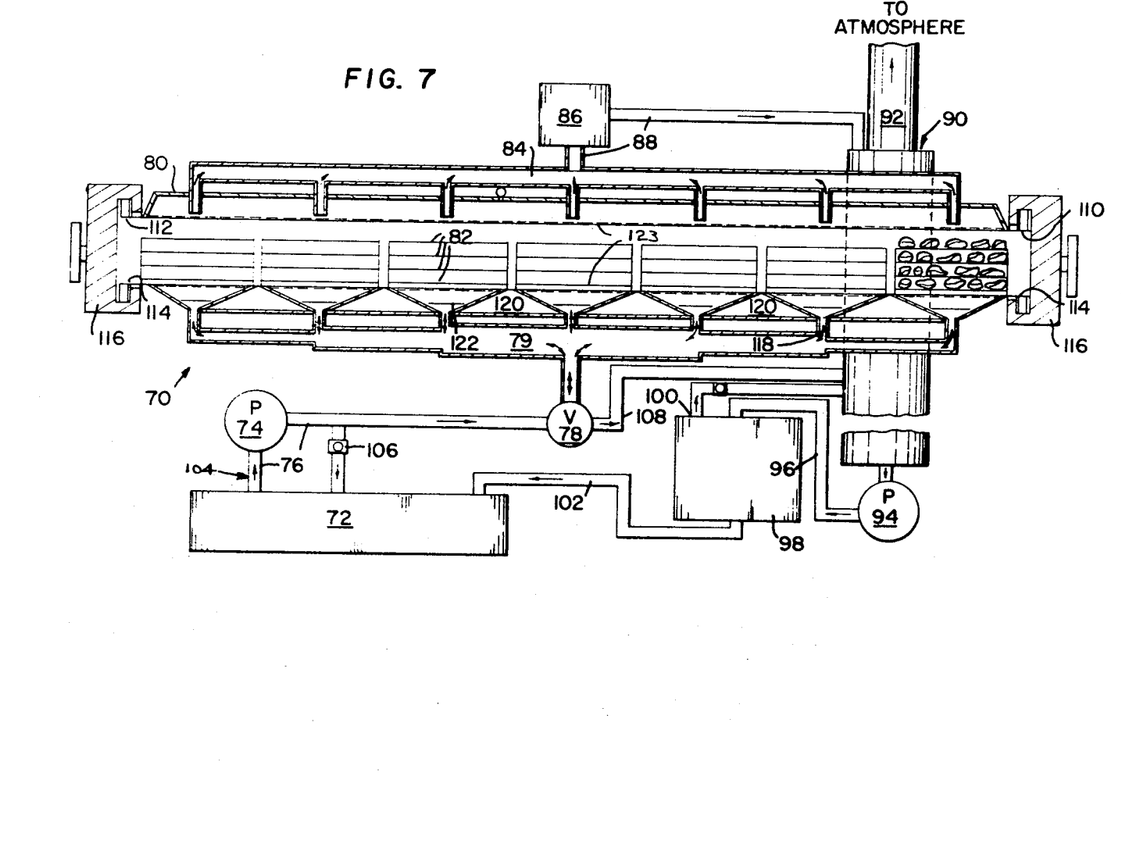
FIG. 7 is a schematic view, not to scale, showing one arrangement that can be used to carry out the present improved process for cooking food, on a commercial scale such as in a food processing plant.

Turning now to FIG. 7, there is shown somewhat schematically a form of cooking apparatus that could be used to practice the present invention on a commercial scale. The apparatus is indicated overall at 70 and includes basically the same component parts as in the embodiments illustrated in FIGS. 1 and 2. That is to say, the apparatus 70 includes a supply of hot cooking liquid 72 (usually fat or oil) which is pumped by an electrically driven gear-type pump 74 through conduit 76 and multiway valve 78 into what might be considered as the intake header or manifold 79 of a pressurizable cooking chamber 80. The cooking chamber 80 is tunnel-shaped and is able to accommodate several sets of stackable trays or racks 82 which are adapted to support pieces of the food to be cooked. This cooking chamber 80 will be described in more detail below. A discharge manifold or header 84 is in fluid-flow communication with the upper portion of the cooking chamber 80, and leads through a discharge conduit 88 and a pressure regulating valve 86 to an exhaust chamber 90. As in the case of the apparatus shown in FIGS. 1 and 2, the exhaust chamber 90 is vented to atmosphere at 92 by means of a simple duct. As installed in a restaurant, that duct could simply extend through the roof, and be suitably capped to prevent rain, snow, etc., from entering. From the exhaust chamber 90, the hot cooking liquid is pumped by a second electrically driven gear pump 94 through a conduit 94 into a filter housing 98 containing a filter assembly used to remove particulate impurities from the cooking liquid. As in the previous embodiments, the filter housing 98 is vented as at 100 to exhaust chamber 90. Finally, a return conduit 102 conveys the filtered cooking liquid back to the supply reservoir 72 where reheating takes place prior to reuse.

Depending upon the actual capacity of the pressurizable cooking chamber 80, the supply 72 of hot cooking liquid can be either one or several fat fryers that are themselves of conventional design, or a custom-made tank equipped with suitable heating means, such as gas or electricity. As in the earlier embodiments, a bypass line 104 having a check valve 106 therein connects the inlet conduits 76 downstream of pump 74 to the supply 72 of hot cooking liquid. It is also to be noted that as in the previous instances, the pump 74 has an adjustable bypass control built into the same, and by adjusting that control the operator can preselect the pump delivery pressure which will give the pressure desired in the multiway valve 78. Preferably, that valve 78 is of a construction and operation that is the same as in valve 22 of FIGS. 1 and 2. Again, as in the earlier embodiments, the check valve 106 functions to relieve the pressure on the pump when multiway valve 78 is in a condition allowing a "low" volume flow rate of cooking liquid to be pumped into and through cooking chamber 80. In addition, that check valve 106 assists in allowing the main biasing spring in multiway valve 78 to function to reset that valve for the draining of cooking liquid from cooking chamber 80.

The multiway valve 78 could be replaced by a number of individual and associated uni-directional valves that function at certain times in the cooking operation to direct the cooking liquid from pump 74 into the inlet manifold 79; while at other times the valves would allow the cooking chamber 80 and inlet manifold 79 to be drained of substantially any cooking liquid, back to the supply 72 by conduit 108 and the exhaust chamber 90. It should be noted that preferably both the cooking chamber 80 and the inlet manifold 79 (which may be part of the chamber 80 or may be spaced slightly from the same), will be drained of substantially all cooking liquid following each cooking cycle. In that way, any impurities which may have been picked up from the food being cooked will be filtered from the cooking liquid before the latter is reheated and used again. If a certain amount of cooking liquid were allowed to remain within the inlet manifold 79 following each cooking operation, the accumulation of impurities in the form of seasoned flour, bread crumbs, pieces of cooked food or the like will quickly contaminate the incoming and clean cooking liquid introduced into the manifold 79 and cooking chamber 80 in the next cooking cycle.

As indicated above, cooking chamber 80 is tunnellike in shape longitudinally of the same. This cooking chamber 80 is provided at opposite ends thereof with an inlet opening 110 and an outlet opening 112. Both of those openings are provided with outwardly extending flanges 114 that cooperate with closure means 116 to effect closing and enable sealing of the same. The inlet manifold 79 is preferably located adjacent the chamber 80, but can be integral with the bottom thereof. A series of inlet ports 118 are provided at spaced intervals in the bottom of cooking chamber 80, and cone-shaped structures 120 may be used to contribute to improved circulation of the cooking liquid. A series of solid and perforated baffles 122 and 123 respectively are provided in the cooking chamber 80, spaced slightly inwardly of each of the inlet ports 118. In that way, the inflow of hot cooking liquid is evenly distributed to flow upwardly around the pieces of food contained on the series 82 of stackable trays. It will be apparent that in effect, each series 82 of trays of food can be thought of as being located within its own cooking zone, whereas in reality in this embodiment, those cooking zones are not physically separated one from another, but instead collectively form the interior of the cooking chamber 80.

It will be apparent that since edible products are being processed in the apparatus 70, and this also applies to the embodiments shown in FIGS. 1 and 2, all components which come in contact with either the food to be cooked, or with the hot cooking liquid which itself contacts the food, will be made either of stainless steel, a nontoxic plastic material, or some other material approved by the Food and Drug Directorate of the country, state or province in which the apparatus is being used. Furthermore, it will be apparent that in using cooking liquids other than fat or oil, the materials from which various components that come into contact with that liquid are made, will be inert and not affected as regards corrosion by that liquid. It is expected that most of these materials and specifications will be apparent to those knowledgeable in this art.

The improved process described herein can readily be practised using the apparatus 70 in a manner which is basically the same as the operation described in connection with the embodiments of FIGS. 1 or 2. In other words, the food to be cooked will usually be treated initially by coating with seasoned flour, bread crumbs, cornmeal or the like prior to placing the same onto the racks or trays used to support the food within the cooking chamber 80. These trays of food are then preferably stacked one upon the other and by opening inlet door 116 are conveyed, usually automatically, into the interior of cooking chamber 80. In the particular version illustrated in FIG. 7, seven series of stackable trays are shown. As soon as an additional seven series of stacked trays of food are ready and the food on those in chamber 80 is cooked, the former will be moved into the cooking chamber 80, and by having outlet door 116 open, the series of trays containing the cooked food will simultaneously be pushed out of the chamber 80. Once the new "batch" or series of trays of food to be cooked is in the cooking chamber 80, the inlet and outlet doors 116 are closed and sealed tight. At that point, the operating staff will generally turn a master switch "on" that is in a main control circuit of conventional design (and not shown here), for governing the operation and timing of various component parts of the apparatus 70. In particular, the multiway valve at 78 and the driving means for pump 74 are activated to enable hot cooking liquid to be pumped into the inlet manifold 79. It will be apparent that a certain time interval is required to fill the cooking chamber 80 with hot cooking liquid, and following that, the liquid will flow out into the exhaust chamber 90. The driving means for pump 94 will be energized so that the liquid which is now accumulating in exhaust chamber 90 will be pumped therefrom through the filter assembly and back to the supply 72 of cooking liquid where it is reheated. Although such indicating means are not shown, it will be apparent that various pressure, temperature and "condition indicating" lights or gauges will be associated with the control circuit to monitor various operating conditions within different parts of the apparatus 70.

As suggested by the foregoing description, it will be apparent that any food that is being inserted into, or being removed from the cooking chamber 80 will take place when that chamber is substantially empty of any hot cooking liquid. For reasons mentioned earlier, it is preferable to drain liquid from the main body of the cooking chamber 80 as well as from the inlet manifold 79, in order to ensure removal of any impurities from a maximum volume of the cooking liquid being used in the system. As before, main pump 74 will provide hot cooking liquid at a superatmospheric pressure which is greater than the operating pressure desired, as controlled by regulating valve 86 for the cooking chamber 80. In that way, there is no reliance on having an adequate amount of moisture and natural juices within the food to be cooked, to be vapourized and generating the desired cooking pressure within chamber 80. Also as before, the valve means shown at 78 will preferably be pressure-responsive so that a failure of pump 74 will effect draining of the cooking liquid from the cooking chamber 80 and inlet manifold 79. This prevents any overcooking and wastage of the food therein. It will also be apparent that as in the embodiments of FIGS. 1 and 2, there is a continuous, controlled amount of the hot cooking liquid circulating throughout the cooking chamber 80 during the time period in which cooking is taking place. That controlled amount is selected by adjustably setting the "low flow" in multiway valve 78, as desired. Moreover, filtering of the cooking liquid and venting of steam therefrom also take place continuously so as to maintain maximum purity of the cooking liquid.

Figure 8:
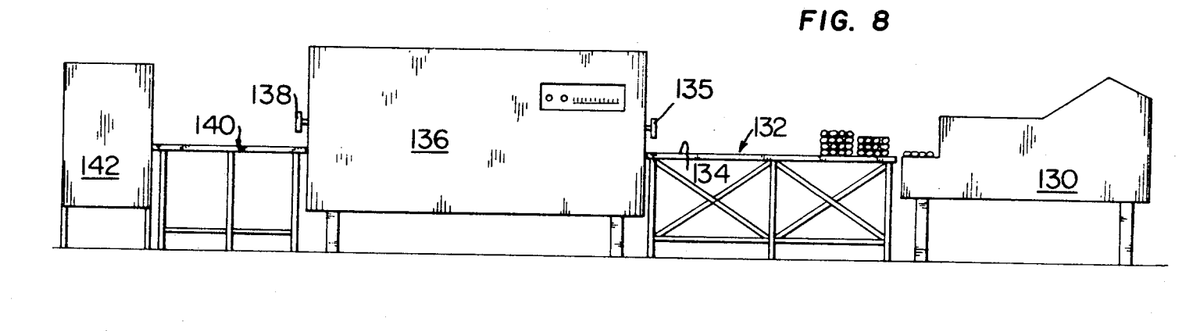
FIG. 8 is a side elevation view showing schematically the interrelationship of various major components in one form of apparatus that can be used to practice the improved process for preparing food that is being precooked by pressure cooking, as will be further described below.

FIG. 8 shows schematically one embodiment of an arrangement for preparing food that is being precooked by pressure cooking in a hot cooking liquid under pressure, in accordance with one aspect of the present invention. Hence, FIG. 8 illustrates an "assembly line" arrangement for processing food. In this arrangement, a coating apparatus is shown at 130, with this coating apparatus being of either conventional design, or preferably, in accordance with the apparatus described in my copending patent application Ser. No. 845,729, filed July 29, 1969. It is expected that at least one operator will take the pieces of food that have been coated with either seasoned flour, bread crumbs, or the like in the apparatus 130 and place the same onto the stackable trays. These trays are supported on a conveyor table 132. This conveyor table 132 has an upper surface 134 which may include either an endless belt or a series of rollers that are adapted to easily convey the stacked trays of food from right to left as seen in FIG. 8. The conveyor table 132 will be positioned to have its discharge end located immediately adjacent the inlet 135 to a cooking apparatus 136. That cooking apparatus 136 will generally be housed within an enclosure, and will preferably be constructed and operated identically to the apparatus shown at 70 in FIG. 7. The cooking apparatus 136 has an outlet end 138 which is located immediately adjacent a receiving conveyor 140. That receiving conveyor will preferably include a top surface having roller means therein or a moving endless belt. In any event, the pieces of food that have now been cooked will be removed from the trays on which they were supported, sorted if required, and fed either manually or preferably automatically into a packaging apparatus shown schematically at 142. This packaging apparatus 142 can be of a design known in the art, and will accommodate a continual incoming flow of individual items of food which will usually be packaged collectively with a selected number of food items in each package. It will be apparent that when pieces of chicken, for example, are being processed, some sorting will be required. That is usually done by hand and involves separating the chicken legs, wings, breasts and so on into groups or units. Each such unit will consist of a number of different pieces of chicken, so as to avoid exposing a consumer to the random chance of buying a frozen package of say three wings, which he would presumably find objectionable. If fish sticks or another food was being processed in which all pieces are identical, no sorting would be needed. There, an automatic infeed to the packaging apparatus would be acceptable.

The foregoing disclosure has described an improved process for cooking food in a liquid under pressure greater than atmospheric, and has indicated various arrangements for practising that process. Certain modifications can be made to both the process and the apparatus for practising the same. It is intended that all such modified processes as will be apparent to those skilled in this art are to be encompassed within the spirit of the invention, as defined in the claims below.

I claim:

1. An automated process for pressure cooking food in a pressurizable chamber, comprising the steps of placing the food into the chamber which is substantially dry of any cooking liquid; closing and sealing the chamber; heating a cooking liquid to a temperature of about 375° F. in a zone exterior to said chamber; introducing said hot cooking liquid under pressure into the chamber to immerse and effect cooking of the food therein; maintaining a preselected pressure in the chamber during cooking; circulating a controlled volume of liquid during cooking through said chamber thus maintaining the desired temperature at which the food is cooked; draining the cooking liquid from the chamber after a predetermined interval of time; unsealing and opening the chamber; and then removing the cooked food from the chamber.

2. A process for preparing food that is being precooked by pressure cooking in hot cooking liquid under pressure, comprising the steps of coating the food to be cooked with an edible coating material; conveying the coated food to a pressurizable cooking chamber and inserting the food into said chamber when the latter is substantially dry of any cooking liquid; closing and sealing the cooking chamber; heating a cooking liquid to a temperature of about 375° F. in a zone exterior to said chamber; introducing the hot cooking liquid into said chamber under pressure to immerse and effect cooking of the food; maintaining a preselected pressure in the chamber during cooking; circulating a controlled volume of liquid during cooking through said chamber thus maintaining the desired temperature at which the food is cooked; draining the hot cooking liquid from the chamber after a predetermined interval of time; unsealing and opening the cooking chamber to enable removal of the cooked food therefrom; conveying the cooked food to a packaging location; and packaging said cooked food for later distribution to consumers.

3. The process of claim 2 including the step of causing the cooking liquid to quickly enter the chamber from the bottom to the top thus avoiding washing the coating off the food pieces and immersing all of the food pieces at nearly the same time.

* * * * *